(12) United States Patent
Momoki et al.

(10) Patent No.: US 7,301,700 B2
(45) Date of Patent: Nov. 27, 2007

(54) POLARIZATION BEAM SPLITTER AND OPTICAL SYSTEM USING THE SAME, AND IMAGE DISPLAYING APPARATUS, USING THE SAME

(75) Inventors: Kazuhiko Momoki, Saitama (JP); Keiji Ohtaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/531,138

(22) Filed: Sep. 12, 2006

(65) Prior Publication Data
US 2007/0058251 A1    Mar. 15, 2007

Related U.S. Application Data

(63) Continuation of application No. 10/930,128, filed on Aug. 31, 2004, now Pat. No. 7,116,478.

(30) Foreign Application Priority Data
Sep. 1, 2003   (JP)  .............................. 2003-308787

(51) Int. Cl.
*G02B 5/30*    (2006.01)
(52) U.S. Cl. .................. 359/486; 359/569; 353/20
(58) Field of Classification Search ...................... None
See application file for complete search history.

(56) References Cited

U.S. PATENT DOCUMENTS

| 4,367,921 A | 1/1983 | Sawamua et al. ........... 350/164 |
|---|---|---|
| 5,042,925 A | 8/1991 | Broer et al. .................. 359/37 |
| 6,288,840 B1 | 9/2001 | Perkins et al. .............. 359/486 |
| 6,426,837 B1 * | 7/2002 | Clark et al. .................. 359/485 |
| 6,447,120 B1 | 9/2002 | Hansen et al. ................. 353/20 |
| 6,829,090 B2 | 12/2004 | Katsumata et al. .......... 359/486 |
| 2005/0012996 A1 | 1/2005 | Miyazawa et al. ........... 359/486 |

FOREIGN PATENT DOCUMENTS

WO    00/57215 A    11/2000

OTHER PUBLICATIONS

Honkanen M, et al. "Inverse Metal-Strip Polarizers" Applied Physics B: Laser and Optics, Springer International, Berlin, DE, vol. B68, No. 1. 1999, pp. 81-85.
Deer, Yi, et al. "Broadband Polarizing Beam Splitter Based on the Form Birefringence of a Subwavelenght Grating in the Quasi-Static Domain" Optics Letters Opt. Soc. America USA, vol. 29, No. 7, Apr. 1, 2004. pp. 754-756.
Lalanne, et al. "A Transmission Polarizing Beam Splitter Grating" Journal of Optics A: Pure and Applied Optics, vol. 1, 1999, pp. 215-219.
Lopez, et al. "Wave-Plate Polarizing Beam Splitter Based on a Form-Birefringent Multilayer Grating" Optics Letters, vol. 23, No. 20, Oct. 15, 1998, pp. 1627-1629.

* cited by examiner

*Primary Examiner*—Stephone B. Allen
*Assistant Examiner*—Derek S. Chapel
(74) *Attorney, Agent, or Firm*—Morgan & Finnegan, LLP

(57) ABSTRACT

The polarization beam splitter of the present invention includes a polarized beam splitting layer having a structure in which a plurality of gratings parallel to a first direction are periodically disposed in a second direction orthogonal to the first direction, and of light incident on the polarization beam splitter, light having a chiefly polarized component parallel to the first direction is transmitted therethrough, and light having a chiefly polarized component parallel to the second direction is reflected.

17 Claims, 8 Drawing Sheets

FIG. 3A
FIG. 3B
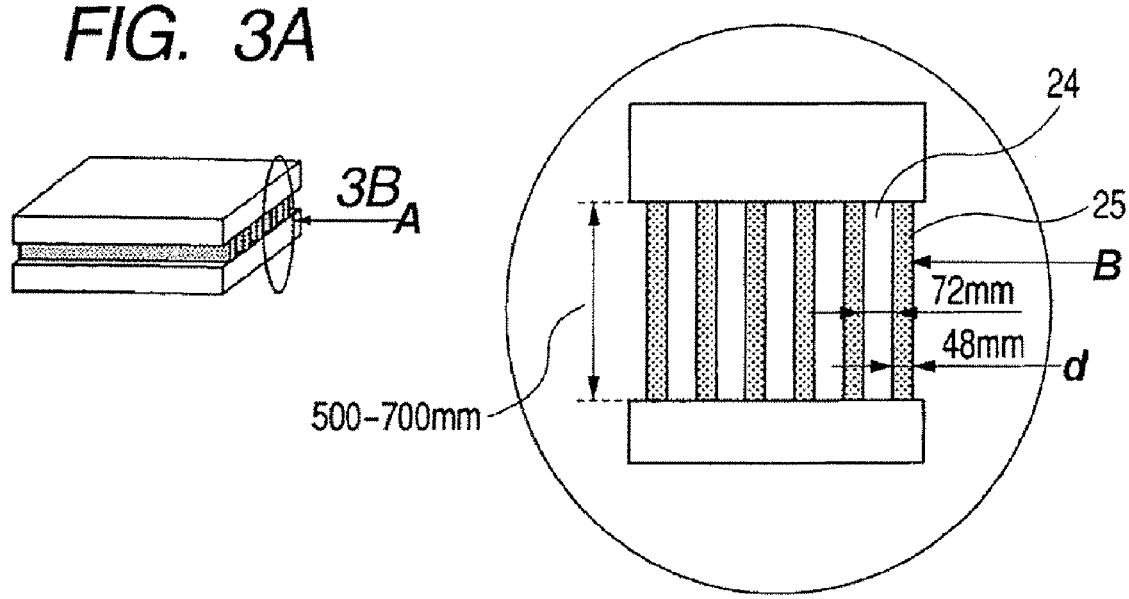
FIG. 4A
FIG. 4B
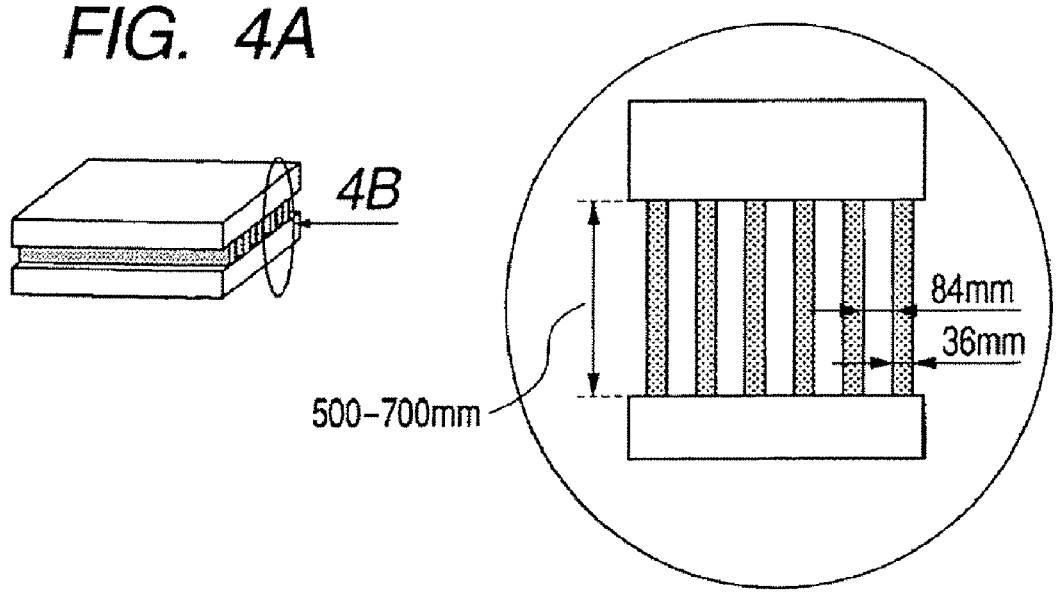

POLARIZATION BEAM SPLITTER AND OPTICAL SYSTEM USING THE SAME, AND IMAGE DISPLAYING APPARATUS, USING THE SAME

This application is a continuation of application Ser. No. 10/930,128, filed Aug. 31, 2004 (now U.S. Pat. No. 7,116,478), which is incorporated herein in its entirety.

BACKGROUND OF THE INVENTION

1. Field of the Invention

This invention relates to a polarization beam splitter used in lights of a plurality of wavelengths or bands, and relates, for example, to various optical apparatuses such as an image taking optical system, a projection optical system (projector), an image processing apparatus and a semiconductor manufacturing apparatus.

2. Description of Related Art

There is known a polarization beam splitter using dielectric material multi-layer film comprising two kinds of media. As shown in FIG. 12 of the accompanying drawings, it uses transmission (19) at Brewster's angle regarding P polarized light (18) incident on multi-layer film 17, and effects reflection (21) by the interference of the multi-layer film regarding S polarized light (20).

Generally, when the refractive index of the medium on the incidence side with an interface as the boundary is defined as n1 and the refractive index of the medium on the emergence side is defined as n2, the Brewster's angle θB is given by the following expression (1):

$$\tan \theta_B = n2/n1 \tag{1}$$

It is necessary that this relation is satisfied by a prism medium and a plurality of media forming the dielectric material. Among the refractive index np of the prism medium, the refractive index nH of a high refractive index layer forming the dielectric material and the refractive index nL of a low refractive index layer, it is necessary that the following relational expression is satisfied.

$$n_P = \sqrt{\frac{n_H^2 n_L^2}{\sin^2\theta_B(n_H^2 + n_L^2)}} \tag{2}$$

Regarding the S polarized light, reflecting film by multi-layer film interference is constituted by the use of the reflectances of the medium H of the high refractive index layer and the medium L of the low refractive index layer. It is possible to realize reflecting film for the entire area of visible light by 20 to 40 layers. Regarding the S polarized light, by increasing the number of the layers of the film, it is possible to secure an angle characteristic and a wavelength characteristic widely.

On the other hand, as is disclosed in U.S. Pat. No. 5,042,925, there is known a polarization beam splitter sandwiching an adhesive agent having birefringence, instead of dielectric material multi-layer film, between prisms. This uses the refractive index difference of a birefringent material between a normal ray and an abnormal ray, and the refractive index difference is not great, but yet by using it at a great incidence angle of about 60°, one polarized light is selectively totally reflected to thereby realize polarized light separation.

For total reflection to occur, the incidence angle need be a critical angle θC or greater, and the critical angle θC is given by the following expression:

$$\sin \theta_C = n2/n1 \tag{3}$$

Also, as a polarization beam splitter using sub-wavelength structure (SWS) having a period of a used wavelength or less, there is known one as shown in FIG. 11 of the accompanying drawings wherein multi-layer film is etched into a rectangular grating shape. Here, the wavelength used is a wavelength supposed to be used in an optical element. When the supposed wavelength has a band, the wavelength band is defined as a used wavelength area, and the central wavelength thereof is defined as the used wavelength. For example, in the case of an optical element supposed to be used in visible light, the used wavelength is defined as the central wavelength of a visible area even if light incident on the element includes lights of the other wavelength areas than the visible area infrared to ultraviolet. High refractive index layers (H layers) 15 of $TiO_2$ or the like and low refractive index layers (L layers) 16 of $SiO_2$ or the like were alternately laminated, and they were etched so that the ratio of the pitch (period) of periodic structure to the medium (grating width), i.e., a filling factor f, might be about 0.5. The period of the rectangular grating forms structural birefringence as structure shorter than the wavelength.

In a rectangular grating as shown in FIG. 8A of the accompanying drawings wherein a medium 22 of a refractive index n1 and a medium 23 of a refractive index n2 (in this case, the air between gratings) are repeated at a ratio of a:b (i.e., the filling factor f=a/(a+b)), when a direction parallel to the grating is defined as TE and a direction orthogonal to the grating is defined as TM, it is known that the structural birefringence in the direction TE and the direction TM is represented by the following expressions (4) and (5), respectively:

$$TE\, n_{TE} = \sqrt{\frac{an_1^2 + bn_2^2}{a+b}} \tag{4}$$

$$TM\, n_{TM} = \sqrt{\frac{a+b}{\frac{a}{n_1^2} + \frac{b}{n_2^2}}} \tag{5}$$

At this time, irrespective of the ratio of a:b, nTE>nTM and therefore, in the direction TE, the refractive index difference between the H layer and the L layer is great, and in the direction TM, the refractive index difference between the H layer and the L layer is small. When an appropriate prism medium is adopted, the condition of the Brewster's angle is satisfied in the direction TM and the P polarized light can be transmitted. The thickness of each layer is independent on the condition of the Brewster's angle and therefore, by optimizing the film thicknesses of the H layer and the L layer, it is possible to form dielectric material multi-layer film. Thereby, the S polarized light is reflected and the function as a polarization beam splitter is obtained. This more heightens the degree of selection of a medium satisfying the condition of the Brewster's angle in P polarized light than a polarization beam splitter constituted by dielectric material thin film alone. Therefore, at the same time, it is possible to secure the reflectance in the S polarized light high. This leads to the feature that a polarization beam splitter covering the entire visible light area can be constituted by the order of 20 layers.

SUMMARY OF THE INVENTION

In the polarization beam splitter using the dielectric material multi-layer film, however, the condition of Brewster's angle is used for the transmission of P polarized light and therefore, the refractive indices of a prism glass material and the medium of the thin film are subject to the limitation of expression (2) above and also, it is difficult to secure an angle characteristic widely. This is not improved even if the number of layers is increased.

In a polarization beam splitter with a high molecular material having birefringence sandwiched between prisms, the refractive index difference of the high molecular material between a normal ray and an abnormal ray is not great and therefore, to effect total reflection, the incidence angle must be about 60° or greater, and this leads to the problem that the use of a usable optical system is limited. Also, this element uses a high molecular material or the like as a birefringent element and is therefore inferior from the viewpoints of heat resistance and light resistance.

In the polarization beam splitter of the laminated rectangular grating type using SWS, the construction is complicated and the manufacturing cost is high, and the condition of the Brewster's angle is used for the transmission of P polarized light and therefore, like the dielectric material multi-layer film, it is difficult to obtain a wide angle characteristic. Particularly, as is apparent from the structure of the grating shown in FIG. 11, as the incidence angle becomes great, the refractive index difference between TE and TM becomes null and therefore, the increase in the reflectance at an incidence angle exceeding the Brewster's angle is greater than when dielectric material thin film is used, and this hinders widening the angle characteristic and therefore, an element having sufficient performance cannot be obtained.

In order to solve the above-noted problems, the polarization beam splitter of the present invention is a polarization beam splitter having a polarized beam splitting layer having structure in which a plurality of gratings parallel to a first direction are periodically disposed in a second direction orthogonal to the first direction, and is characterized in that of light incident on the polarization beam splitter, chiefly light of a polarized component parallel to the first direction is transmitted therethrough and chiefly light of a polarized component parallel to the second direction is reflected.

Here, it is desirable that for the light of the used wavelength area, the transmittance of the light of the polarized component parallel to the first direction be 90% or higher, and the reflectance of the light of the polarized component parallel to the second direction be 90% or higher. It is desirable that the used wavelength area be a visible light area. Of course, light of an ultraviolet wavelength area or light of an infrared wavelength area may be used.

Here, it is desirable that the plurality of gratings be arranged at a period shorter than the used wavelength.

Also, it is desirable that the light of the polarized component parallel to the second direction be reflected by the use of total reflection.

Also, it is desirable that when a surface of the polarization beam splitter on which a ray is incident is defined as a first surface, and this first surface and the polarized beam splitting layer are arranged so as to face each other at an angle which is not parallel, and a surface containing a normal to the first surface and a normal to the polarized beam splitting layer is defined as a second surface, the first direction be substantially parallel to the second surface.

Also, it is desirable that the polarization beam splitter have a shape of a square pole type having a diamond-shaped bottom surface obtained by two transparent members of substantially the same triangle pole shape having an isosceles triangle as a bottom surface having had their sides including the bottom sides of their respective isosceles triangles joined to each other. It is better if the first direction is disposed so as to be parallel to the diamond-shaped bottom surface.

Also, it is desirable that the material of the plurality of gratings be a dielectric material, and the space between the plurality of gratings be filled with air. Here, it is better if the dielectric material is titanium oxide ($TiO_2$). It is desirable that when of the period at which the plurality of gratings are arranged, the rate the dielectric material occupies if f, $0.2 < f < 0.8$ ... (6) be satisfied. Here, it is desirable that the polarized beam splitting layer be sandwiched between two optical members. Also, it is desirable that the absolute value of the photoelasticity constant of the two optical members be smaller than $0.1 \times 10^{-8}$ $cm^2/N$. It is desirable that the two optical members have the same refractive index.

Here, it is better if when the refractive index of the optical members is defined as nP, and the refractive index of the dielectric material is defined nG, and of the period at which the plurality of gratings are arranged, the rate the dielectric material occupies is defined as f (filling factor), the following conditional expression is satisfied:

$$0.7 < \frac{\sqrt{fn_G^2 + 1 - f}}{n_P} < 1.3 \qquad (7)$$

Also, it is better if when the refractive index of the optical members is defined as nP, and the refractive index of the dielectric material is defined as nG, and of the period at which the plurality of gratings are arranged, the rate the dielectric material occupies is defined as f (filling factor), and the incidence angle of light onto the polarization beam splitter is defined as θ, the following conditional expression is satisfied:

$$\sin\theta > \frac{1}{n_P \sqrt{\frac{f}{n_G^2} + 1 - f}} \qquad (8)$$

Also, it is better if design is made such that a ray is incident on the polarized beam splitting layer within an angle range including the Brewster's angle determined by the refractive index of the medium of the optical members and the effective refractive index of the polarized beam splitting layer for light having a polarized component parallel to the first direction.

Also, it is better if the refractive index of the medium of the optical members and the effective refractive index of the polarized beam splitting layer for the light having the polarized component parallel to the first direction are made substantially equal to each other.

It is better if the thickness d of the polarized beam splitting layer is such that the relation thereof with the used wavelength λS on the shortest wavelength side of the light of the used wavelength area satisfies the following conditional expression:

$$0.5 < d/\lambda S \qquad (9)$$

Also, it is desirable that design be made such that of the light incident on the polarization beam splitter, chiefly P polarized light is reflected, and chiefly S polarized light is transmitted.

Also, the polarization beam splitter of the present invention has a polarized beam splitting layer having structure in which a plurality of gratings parallel to a first direction are periodically disposed in a second direction orthogonal to the first direction, and is characterized in that of light incident on the polarization beam splitter, chiefly light of a polarized component parallel to the first direction is transmitted, and chiefly light of a polarized component parallel to the second direction is reflected.

Here, P polarized light and S polarized light are ordinary names, and polarized light in which an electric field vibrates in parallel to an incidence flat surface (generally a surface containing an incident ray and a normal to a boundary surface (now the surface of a polarizing element); in the present case, it is defined as a surface containing an incident ray, a reflected ray and a transmitted ray) is P polarized light, and polarized light in which an electric field vibrates in a direction orthogonal to the incidence flat surface is S polarized light.

Also, the image displaying apparatus of this application is characterized by at least one display element, an illuminating optical system for illuminating the aforementioned at least one display element with light from a light source, and a polarized beam splitting as described above.

Also, it is more desirable that the image display apparatus have a projection optical system for projecting light from the aforementioned at least one display element onto a projection surface.

Also, it is desirable that the aforementioned at least one display element be a reflection type display element. Also, it is better if the aforementioned at least one display element be a plurality of display elements, and be designed to have a color resolving system for color-resolving light from a light source for each wavelength (each color) when it is directed to the plurality of display elements, and a color combining system for combining reflected lights from the plurality of display elements. Here, it is more desirable that at least one of the color resolving system and the color combining system have the above polarization beam splitter. Further, it is better if each of the color resolving system and the color combining system has at least one of above described polarization beam splitter.

According to the present invention as previously described, regarding the polarization beam splitter, there is the effect that there can be realized a polarization beam splitter which is simple in both of structure and design, and yet has a high extinction ratio within wide ranges of wavelength characteristic and incidence angle characteristic.

BRIEF DESCRIPTION OF THE DRAWINGS

FIGS. 3A and 3B show the construction of the grating shape of the polarization beam splitter corresponding to the first embodiment of the present invention.

FIGS. 4A and 4B show the construction of the grating shape of a polarization beam splitter corresponding to a second embodiment of the present invention.

DETAILED DESCRIPTION OF THE PREFERRED EMBODIMENTS

Some embodiments of the present invention will hereinafter be described with reference to the drawings.

First Embodiment

Figure 1:
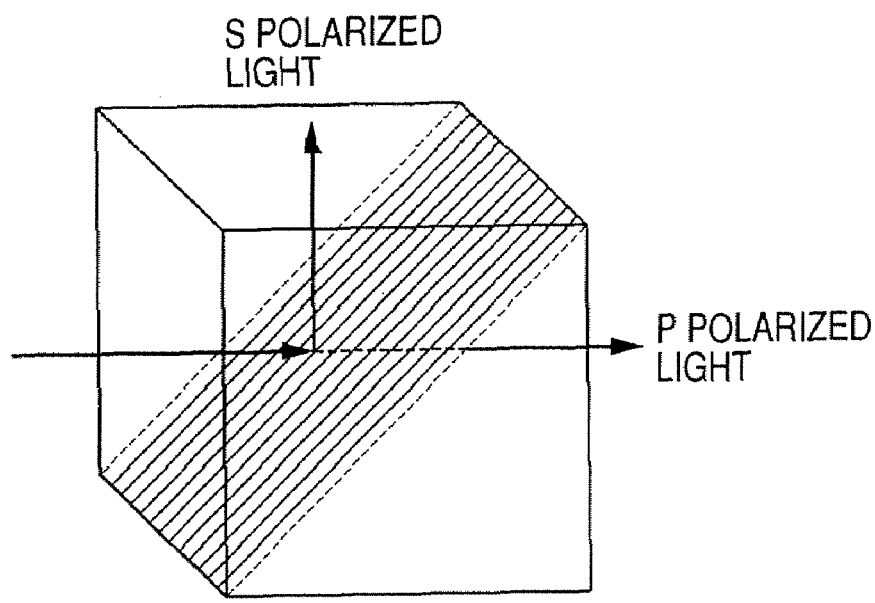
FIG. 1 shows the construction of a polarization beam splitter corresponding to a first embodiment of the present invention.

FIG. 1 shows the construction of a polarization beam splitter according to a first embodiment of the present invention. Tables 1 and 2 below show the numerical values of the constructions by Design Examples 1 and 2 of a grating of SWS used in this first embodiment.

Figure 2:
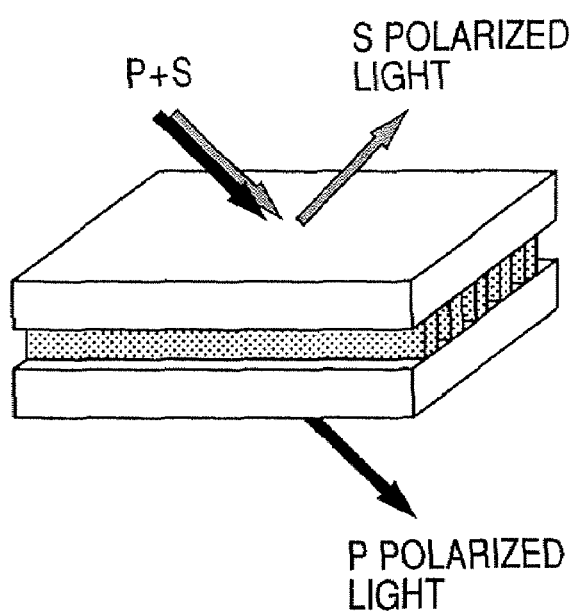
FIG. 2 is a typical view of the polarization beam splitter corresponding to the first embodiment of the present invention.

Referring to FIG. 1, a polarized beam splitting layer is inclined at 45° with respect to the incidence surface of a prism. The grating of SWS, as shown in FIG. 2, is disposed in parallel to the incidence plane, and is designed to reflect S polarized light and transmit P polarized light therethrough. This grating of SWS adopts such a construction as shown in FIGS. 3A and 3B, and as shown in FIG. 3B, the cross-sectional structure of the grating (a direction parallel to this grating, i.e., a direction perpendicular to the plane of the drawings sheet of FIG. 3B, is referred to as A direction) is of rectangular grating structure (the pitch direction of this grating, i.e., a direction parallel to the plane of the drawing sheet of FIG. 3B is referred to as B direction) in which air 24 and $TiO^2$ 25 (other medium will also do) are one-dimensionally alternately repeated, and is of very simple structure in which polarized light separation is realized by this single layer alone. Of course, the portion of the grating of $TiO^2$ may be formed by laminating a plurality of different media with respect to the height direction of the grating (i.e., the vertical direction in the plane of the drawing sheet of FIG. 3B), and the layer of air may be replaced by other medium than air.

The height of the grating is 700 μm, and sufficiently satisfies conditional expression (6) for the light of the wavelength in the visible light area (light of the used wavelength area).

Conditional expression (6) is representative of a condition for completely achieving total reflection. Generally it is known that when light is incident from a medium of a high refractive index to a medium of a low refractive index, if the incidence angle thereof is a critical angle θC or greater, the light is not at all transmitted, but is totally reflected. At this time, however, light called an evanescent wave oozes in a very minute area near a boundary surface. If there is the following medium in the reach area of this light, the light will be transmitted. This phenomenon is attenuated total reflection (ATR), and a conditional expression for preventing this ATR is (6).

In the first embodiment, as per Design Example 1 in Table 1, a material having a refractive index as high as about 1.847 is selected as the glass material of the prism, and $TiO^2$ having a refractive index as high as about 2.339 is also used as a dielectric material constituting the grating, and the filling factor of the grating is set to the range of conditional expressions (7) and (8).

Conditional expression (7) prescribes the condition for the transmission of a polarized component of A direction to the grating structure, and conditional expression (8) prescribes the condition for the total reflection of a polarized component of B direction. Here, when TE is the polarized component of A direction, and TM is the polarized component of B direction, the refractive indices in the respective directions of the structural birefringence are given by the aforementioned expressions (4) and (5).

When the refractive index of the optical member is defined as nP and the one-dimensional grating is constituted by a dielectric material nG and air (the refractive index thereof is 1), expressions (4) and (5) are expressed as (10) and (11), respectively, by the use of the filling factor f.

$$n_{TE} = \sqrt{fn_G^2 + 1 - f} \quad (10)$$

$$n_{TM} = \frac{1}{\sqrt{\frac{f}{n_G^2} + 1 - f}} \quad (11)$$

The Brewster's angle is given by expression (5), and a condition range set to expression (10) substituted for the right side of expression (5) is expression (2).

Consequently, expression (2) is the value of tan of the Brewster's angle θB, and prescribes the upper limit and lower limit of this value. If the upper limit and the lower limit are exceeded, that is, if the difference between the refractive indices of two media becomes great, reflectance increases and the transmission of the polarized component of A direction is hindered.

The total reflection condition is given by expression (7), and expression (11) substituted for the right side of expression (7) to thereby rearrange it is expression (3).

Consequently, expression (3) is the value of sin of the critical angle θC, and when this value is smaller than the incidence angle, total reflection occurs in the angle area of the entire light beam.

Thereby, the effective refractive indices of the gratings become substantially the same refractive indices regarding P polarized light, and cause a great refractive index difference regarding S polarized light, and the rays of the respective polarized lights are transmitted and totally reflected.

Figure 9A:
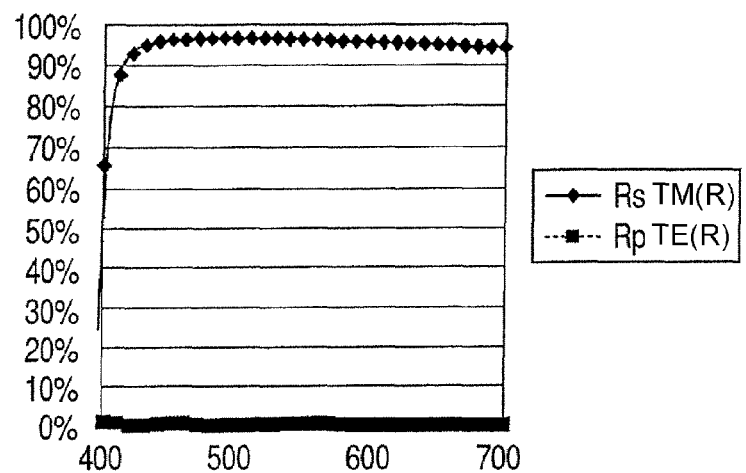
FIGS. 9A, 9B and 9C show the polarized beam splitting characteristics of the polarization beam splitter according to the first embodiment in the visible light area by RCWA calculation, FIG. 9A showing the wavelength characteristics of the reflectance of each polarized light at an incidence angle of 42.0°, FIG. 9B showing the wavelength characteristic of the reflectance of each polarized light at an incidence angle of 45.0°, and FIG. 9C showing the wavelength characteristic of the reflectance of each polarized light at an incidence angle of 55.0°.
Figure 9B:
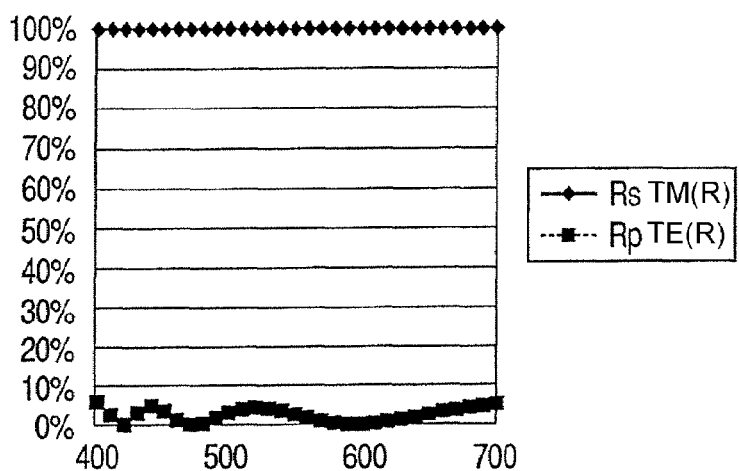
Figure 9C:
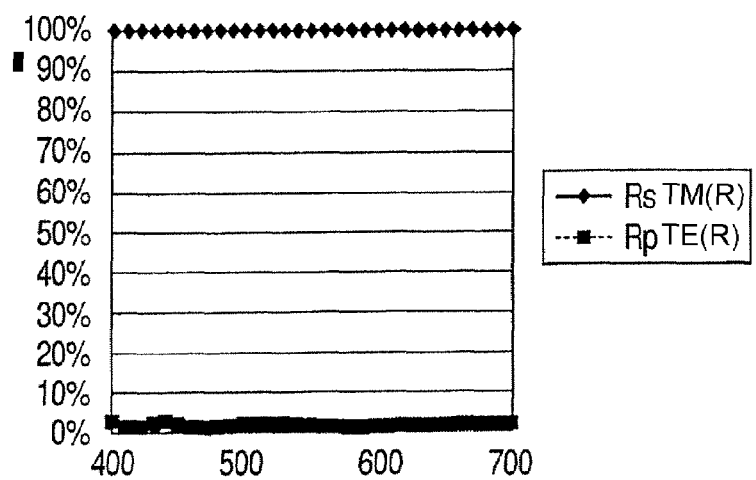

FIGS. 9A to 9C show the result of the simulation of the performance by the rigorous coupled-wave analysis (RCWA) of this design value. On the low incidence angle side on which the total reflection condition is destroyed, the reflectance of S polarized light is lowered, but in the other areas, substantially perfect performance is exhibited.

Figure 8A:
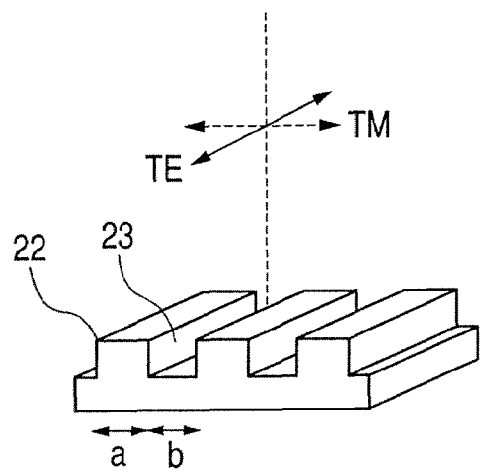
FIGS. 8A and 8B are illustrations of a rectangular type grating of SWS, FIG. 8A illustrating a model of the effective refractive index of the rectangular type grating of SWS, and FIG. 8B being a graph representing structural brefringular type grating of SWS.
Figure 8B:
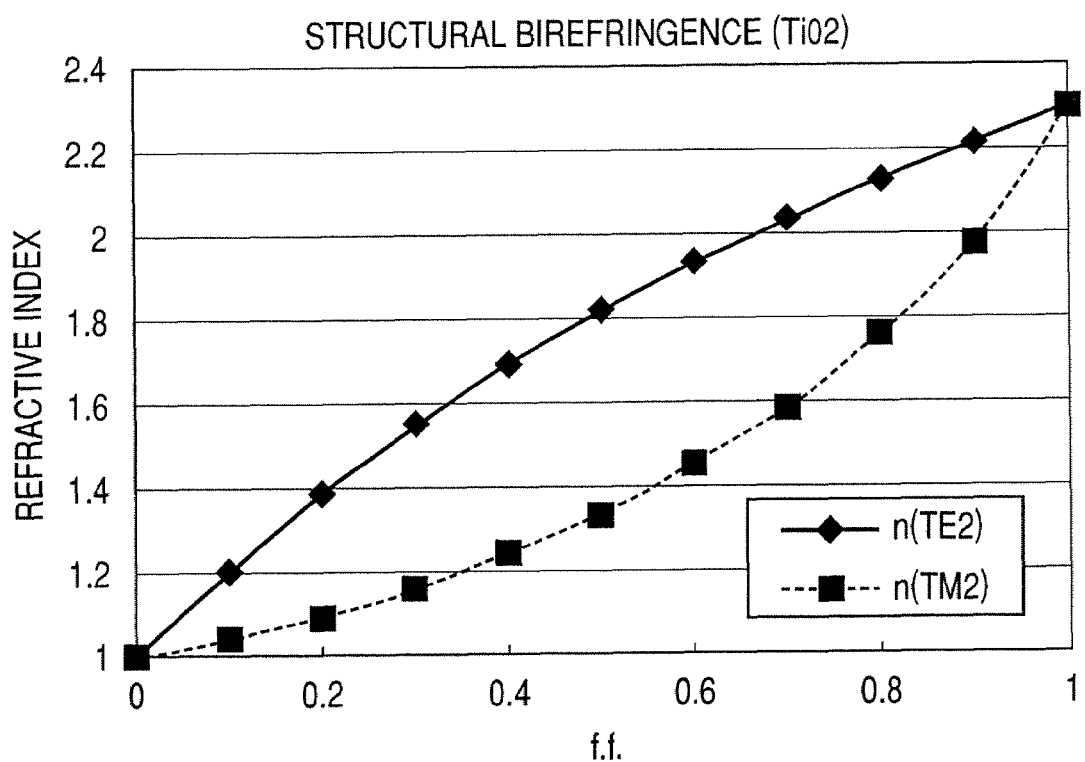

Conditional expression (6) prescribes the range of f (filling factor), and is a condition for chiefly causing structural birefringence efficiently. In the grating of SWS as shown in FIG. 8A, the effective refractive indices in the respective polarizing directions can be found by the above-mentioned expressions (4) and (5), and they are graphed in FIG. 8B. As shown, the fact that there is a difference between the effective refractive indices of TE and TM means having great birefringence, but the refractive index difference for f of the media is 0 for f=0 and f=1, and is maximum in the vicinity of f=0.5, and it is preferable that f be equal to or greater than 0.2 and equal to or less than 0.7. More preferably, f may be equal to or greater than 0.25 and equal to or less than 0.55. Thus, to select f within the range of conditional expression (6) is to efficiently utilize the effective refractive index.

Second Embodiment

FIGS. 4A and 4B show the grating structure of SWS of a polarization beam splitter according to a second embodiment of the present invention. In Tables 1 and 2 below, there is shown the construction by Design Example 2 of the grating of SWS according to the second embodiment. As in the first embodiment, a polarized beam splitting layer is inclined at 45° with respect to the incidence surface of the prism, and is designed to reflect S polarized light and transmit P polarized light therethrough. The cross-sectional structure of the grating is rectangular grating structure in which air and $TiO_2$ are alternately repeated. As shown in Table 2, it is structure satisfying conditional expressions (7) and (8). In the second embodiment, f is set so as to become a value approximate to the lower limit of the condition of expression (7), whereby regarding the total reflection of expression (8), the angle characteristic can be set widely on the short wavelength side.

Figure 10A:
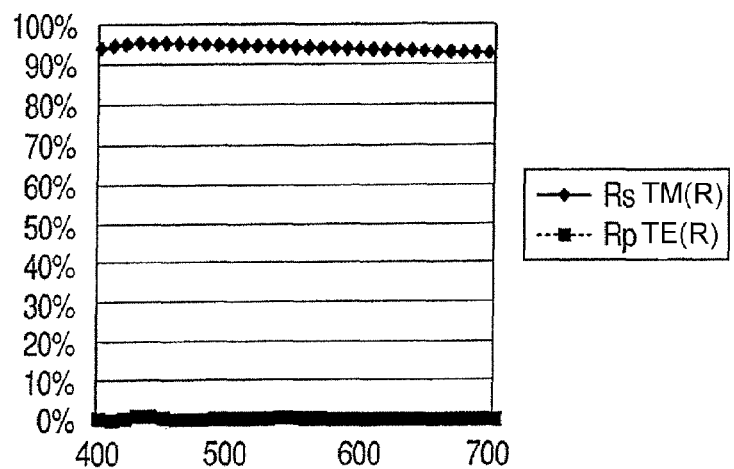
FIGS. 10A, 10B and 10C show polarized beam splitting characteristics of the polarization beam splitter according to the second embodiment in the visible light area by RCWA calculation, FIG. 10A showing the wavelength characteristic of the reflectance of each polarized light at an incidence angle of 37.0°, FIG. 10B showing the wavelength characteristic of the reflectance of each polarized light at an incidence angle of 45.0°, and FIG. 10C showing the wavelength characteristic of the reflectance of each polarized light at incidence angle of 50.0°.
Figure 10B:
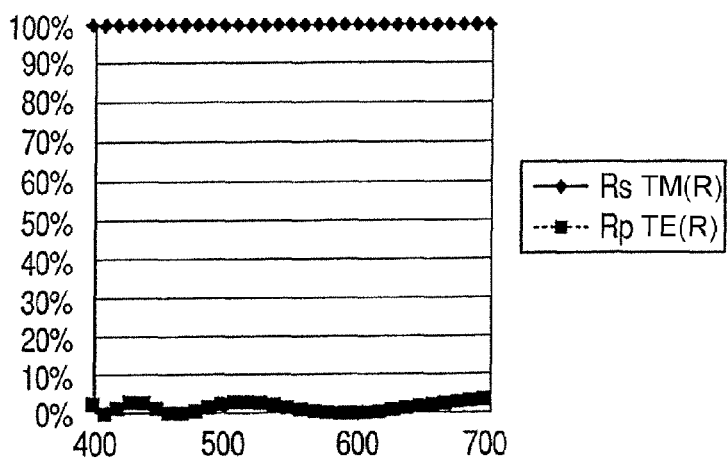
Figure 10C:
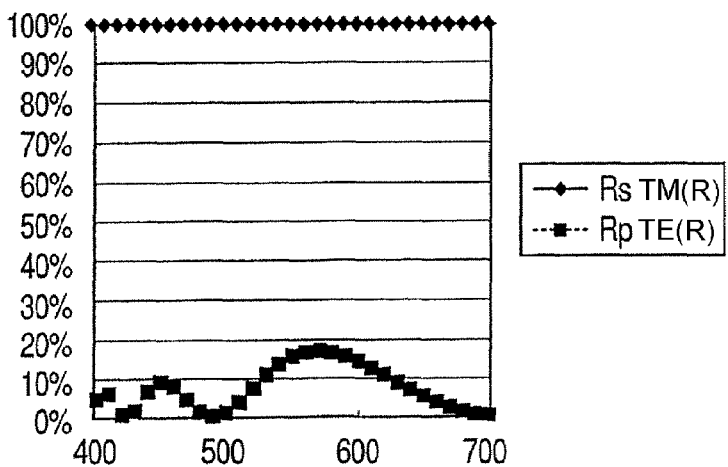
Figure 11:
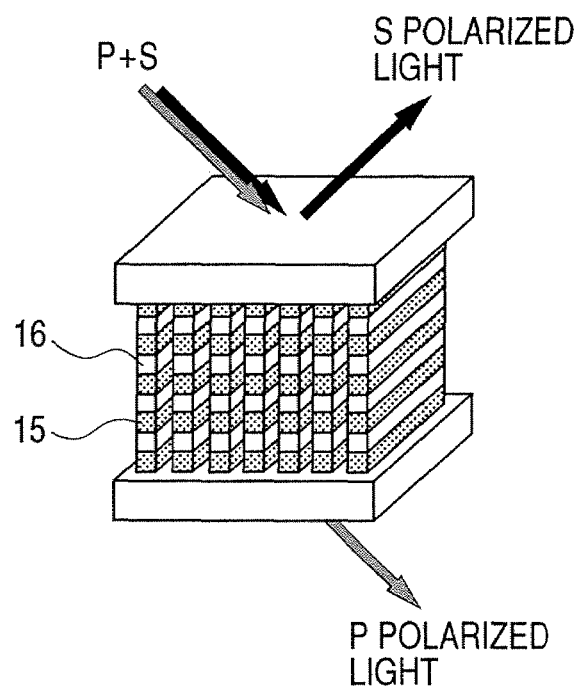
FIG. 11 is a typical view of a conventional polarization beam splitter of a multi-layer film etching type.
Figure 12:
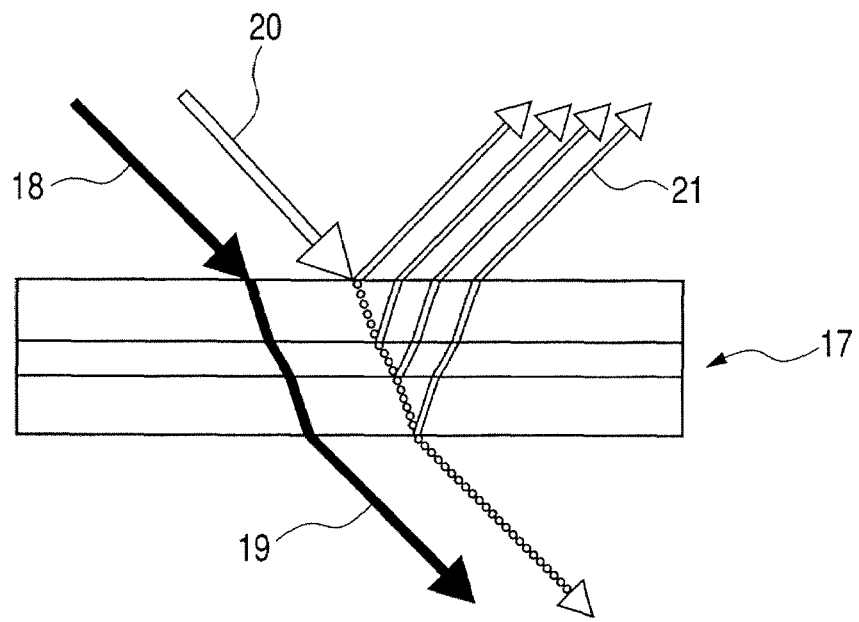
FIG. 12 is a typical view of a conventional multi-layer film polarization beam splitter.

FIGS. 10A-10C show the result of the simulation of the performance by RCWA of this design value. The total reflection condition widens on the low incidence angle side. In exchange for it, the reflectance of P polarized light is high on the high incidence angle side.

Third Embodiment

Figure 5:
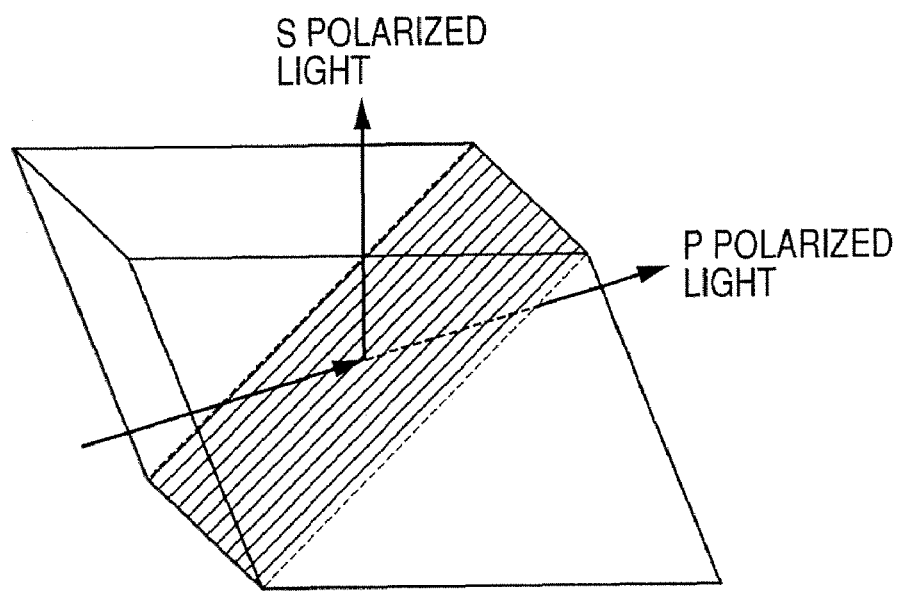
FIG. 5 shows the construction of a polarization beam splitter corresponding to a third embodiment of the present invention.

FIG. 5 shows the construction of a polarization beam splitter prism according to a third embodiment of the present invention. The polarization beam splitter of Design Example shown in Table 1 and Table 2 is inserted in the prism inclined into a diamond shape. Incident light from the left side of FIG. 5 is incident on a prism surface perpendicularly thereto, and is incident on the polarization beam splitter at an angle greater than 45°. Regarding the light being totally reflected, a greater incidence angle is more advantageous, but the prism is inclined into a diamond shape at about 10° as described above, whereby the incidence angle can be changed by 5°.

Fourth Embodiment

Figure 6:
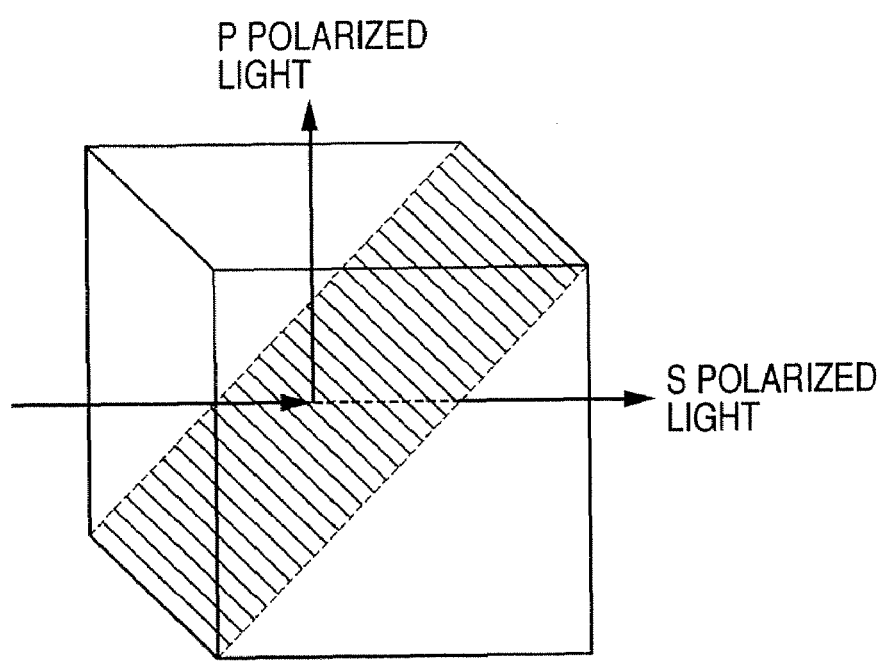
FIG. 6 shows the construction of a polarization beam splitter corresponding to a fourth embodiment of the present invention.

FIG. 6 shows the construction of a polarization beam splitter prism according to a fourth embodiment of the present invention. The polarization beam splitter of Design Example 1 is inserted in a prism of 45°. The direction of the grating is orthogonal to the incidence plane. This embodiment is one in which the transmission and reflection of polarized lights to be separated which cannot be realized by a polarization beam splitter of multi-layer film using the ordinary Brewster's angle are made converse. It is possible to control the direction in which light is to be directed and the direction of polarization.

Fifth Embodiment

Figure 7:
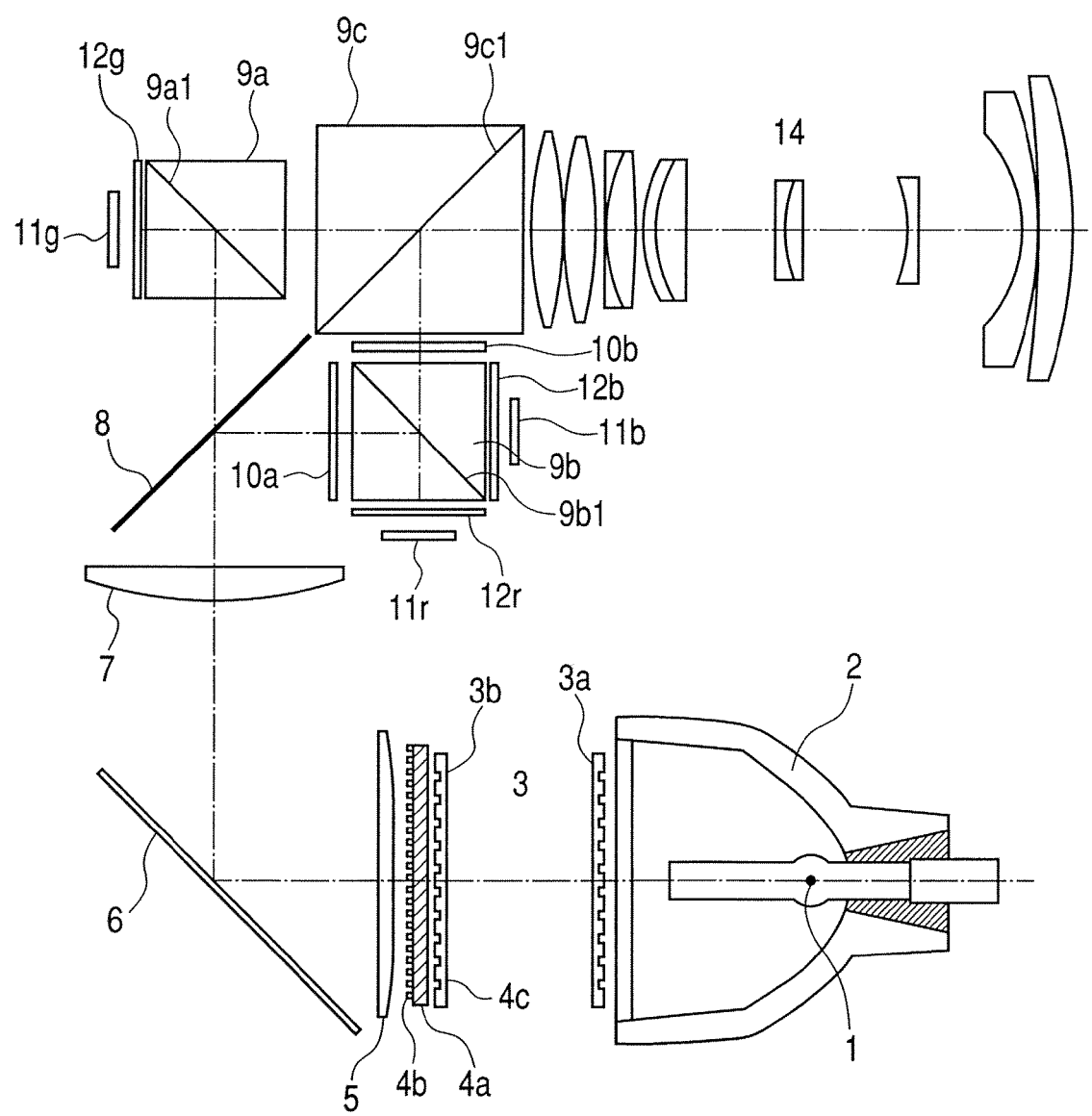
FIG. 7 shows a construction in which a polarization beam splitter corresponding to a fifth embodiment of the present invention is incorporated into a reflection type liquid crystal projector optical system.

FIG. 7 shows a reflection type image modulating apparatus using the polarization beam splitter of the present invention which is a fifth embodiment of the present invention. In FIG. 7, the reference numeral 1 designates a light source comprising a high pressure mercury lamp or the like, the reference numeral 2 denotes a reflector for radiating light from the light source 1 in a predetermined direction, the reference numeral 3 designates an integrator for forming an illuminating area having uniform illuminating intensity, and comprised of fly-eye lenses 3a and 3b, the reference numerals 4a, 4b and 4c denote a polarized light converting element for converting non-polarized light into a predetermined linearly polarized light (making it uniform in a polarizing direction), the reference numeral 5 designates a condenser lens for condensing the illuminating light, the reference numeral 6 denotes a mirror, the reference numeral 7 designates a field lens for making the illuminating light into telecentric light, the reference numeral 8 denotes a dichroic mirror for transmitting green wavelength area light therethrough, and the reference characters 9a, 9b and 9c designate polarized beam splitting prisms having gratings 9a1, 9b1 and 9c1 of polarized beam splitting SWS, and the gratings 9a1, 9b1 and 9c1 of this SWS are the gratings of polarized beam splitting SWS of Design Example 1 or Design Example 2 in Table 1 and Table 2, and have the characteristic of reflecting S polarized light and transmitting P polarized light therethrough. The reference characters 10a and 10b denote color selective phase difference plates for changing (rotating) the polarizing directions of lights of predetermined wavelength areas by 90°, the reference characters 11r, 11g and 11b designate reflection type liquid crystal display elements for reflecting the incident illuminating light and also, modulating it in conformity with an image signal and forming image light, the reference characters 12r, 12g and 12b denote quarter phase difference plates, and the reference numeral 14 designates a projection lens system (which may include a mirror or may be comprised of mirror alone).

If as in the above-described construction, use is made of a polarization beam splitter having the grating structure of SWS, there can be realized a reflection type liquid crystal projector which is excellent in the incidence angle characteristic and the wavelength characteristic and is therefore capable of projecting an image of very high contrast.

TABLE 1

| | Refractive Index of Prism | Grating Medium | Refractive Index of Grating Medium | f(Filling Factor) | Layer Thickness (nm) | Grating Pitch (nm) |
|---|---|---|---|---|---|---|
| Design Example 1 | 1.847 | TiO2 | 2.339 | 0.4 | 700 | 120 |
| Design Example 2 | 1.901 | TiO2 | 2.339 | 0.3 | 700 | 120 |

TABLE 2

| | Refractive Index of Prism | Refractive Index n in TE direction TE | Refractive Index n in TM direction TM | Value of Conditional Expression (2) | Value of Conditional Expression (3) | Brewster's Angle $\theta_B$ | Critical Angle $\theta_C$ |
|---|---|---|---|---|---|---|---|
| Design Example 1 | 1.847 | 1.67 | 1.219 | 0.904 | 0.66 | 64.7 | 33.4 |
| Design Example 2 | 1.901 | 1.53 | 1.151 | 0.805 | 0.605 | 38.8 | 31.2 |

This application claims priority from Japanese Patent Application No. 2003-308787 filed Sep. 1, 2003, which is hereby incorporated by reference herein.

What is claimed is:
1. A polarization beam splitter having:
a polarized beam splitting layer having a structure in which a plurality of gratings parallel to a first direction are periodically disposed in a second direction orthogonal to the first direction, each of the gratings having a refractive index; and
two optical members sandwiching therebetween the polarized beam splitting layer, each of the members having a refractive index of which refractive indices are equal to each other, when the refractive indices of the optical members is defined as nP, and the refractive index of the gratings is defined as nG, and a value obtained by dividing a width of the gratings by a disposing period is defined as f, and an incident angle of light incident into the polarization beam splitter is defined as θ, the following conditional expression is satisfied

$$\sin\theta > \frac{\Box}{n_P \sqrt{\dfrac{f}{n_G^2} + 1 - f}},$$

wherein the light of the polarized component parallel to said second direction is reflected by the use of total reflection.

2. The polarized beam splitter according to claim 1, wherein for light of a used wavelength area, the transmittance of the light of the polarized component parallel to said first direction is 90% or greater, and the reflectance of the light of the polarized component parallel to said second direction is 90% or greater.

3. The polarization beam splitter according to claim 1, wherein said used wavelength area is a visible light area.

4. The polarization beam splitter according to claim 1, wherein said plurality of gratings are arranged at a period shorter than the used wavelength.

5. The polarization beam splitter according to claim 1, wherein when a surface of said polarization beam splitter on which a ray is incident is defined as a first surface, and said first surface and the polarized beam splitting layer are disposed so as to face each other at an angle which is not parallel, and a surface containing a normal to said first surface and a normal to said polarized beam splitting layer is defined as a second surface, said first direction is substantially parallel to said second surface.

6. The polarization beam splitter according to claim 1, which has a shape of a square pole type having a diamond-shaped bottom surface obtained by two transparent members of triangle poles of the substantially the same shape having isosceles triangles as bottom surfaces having their sides including the bottom sides of the respective isosceles triangles joined to each other.

7. The polarization beam splitter according to claim 6, which is disposed so that said first direction may be parallel to said diamond-shaped bottom surface.

8. The polarization beam splitter according to claim 1, wherein when a value obtained by dividing the width of said gratings by said period is defined as f, 0.2<f<0.8 is satisfied.

9. The polarization beam splitter according to claim 1, wherein said polarized beam splitting layer is sandwiched between two optical members, and the absolute value of the photoelasticity constants of said two optical members is smaller than $0.1 \times 10^{-8}$ cm$^2$/N.

10. The polarization beam splitter according to claim 1, wherein said polarized beam splitting layer is sandwiched between two optical members, and the refractive indices of said two optical members are equal to each other.

11. The polarization beam splitter according to claim 10, wherein when the refractive index of said optical members is defined as nP, and the refractive index of said gratings is defined as nG, and a value obtained by dividing the width of said gratings by said period is defined as f, the following conditional expression is satisfied:

$$0.7 < \frac{\sqrt{fn_G^2 + 1 - f}}{n_P} < 1.3.$$

12. The polarization beam splitter according to claim 1, wherein said polarized beam splitting layer is sandwiched between two optical members, and a ray is incident on said polarized beam splitting layer within an angle range including Brewster's angle determined by the refractive index of the media of said optical members and the effective refractive index of said polarized beam splitting layer for the light having the polarized component parallel to said first direction.

13. The polarization beam splitter according to claim 1, wherein said polarized beam splitting layer is sandwiched between two optical members, and the refractive index of the media of said optical members and the effective refractive index of said polarized beam splitting layer for the light having the polarized component parallel to said first direction are substantially equal to each other.

14. The polarization beam splitter according to claim 1, wherein the thickness d of said polarized beam splitting layer is such that the relation thereof with a wavelength XS on the shortest wavelength side of light of a used wavelength area satisfies the following condition:

$$0.5 < d/\lambda S.$$

15. An image displaying apparatus comprising: a display element; and an illumination optical system comprising the polarization beam splitter according to claim 1, for illuminating the display element with light from a light source.

16. A polarization beam splitter having:
a polarized beam splitting layer having a structure in which a plurality of gratings parallel to a first direction are periodically disposed in a second direction orthogonal to the first direction, each of the gratings having a refractive index; and
two optical members sandwiching therebetween the polarized beam splitting layer, each of the members having a refractive index of which refractive indices are equal to each other, when the refractive indices of the optical members is defined as nP, and the refractive index of the gratings is defined as nG, and a value obtained by dividing a width of the gratings by a disposing period is defined as f, and an incident angle of light incident into the polarization beam splitter is defined as θ, the following conditional expression is satisfied $$\sin\theta > \frac{1}{n_P \sqrt{\frac{f}{n_G^2} + 1 - f}},$$

wherein for light of a used wavelength area, the transmittance of the light of the polarized component parallel to said first direction is 90% or greater, and the reflectance of the light of the polarized component parallel to said second direction is 90% or greater.

17. An image displaying apparatus comprising: a display element; and an illumination optical system comprising the polarization beam splitter according to claim 16, for illuminating the display element with light from a light source.

* * * * *

UNITED STATES PATENT AND TRADEMARK OFFICE
CERTIFICATE OF CORRECTION

PATENT NO. : 7,301,700 B2 Page 1 of 1
APPLICATION NO. : 11/531138
DATED : November 27, 2007
INVENTOR(S) : Momoki et al.

It is certified that error appears in the above-identified patent and that said Letters Patent is hereby corrected as shown below:

On the Title Page, Item "(56) References Cited", sub-heading "OTHER REFERENCES":

Change

"Deer, Yi, et al. "Broadband Polarizing Beam Splitter Based on the Form Birefringence of a Subwavelenght Grating in the Quasi-Static Domain" Optics Letters Opt. Soc. America USA, vol. 29, No. 7, Apr. 1, 2004. pp. 754-756)"

to

-- Deer, Yi, et al. "Broadband Polarizing Beam Splitter Based on the Form Birefringence of a Subwavelength Grating in the Quasi-Static Domain" Optics Letters Opt. Soc. America USA, vol. 29, No. 7, Apr. 1, 2004. pp. 754-756--.

Signed and Sealed this

Twentieth Day of May, 2008

JON W. DUDAS
*Director of the United States Patent and Trademark Office*